Inventor
JULIUS SISHC

July 24, 1956  J. SISHC  2,755,614
BEET TOPPING DEVICE HAVING TOP DISPOSAL MEANS
Filed March 19, 1952  6 Sheets-Sheet 2

Inventor
JULIUS SISHC
By
Howard F. Sweet.
Attorney

Inventor
JULIUS SISHC
By Homer G. Sweet
Attorney

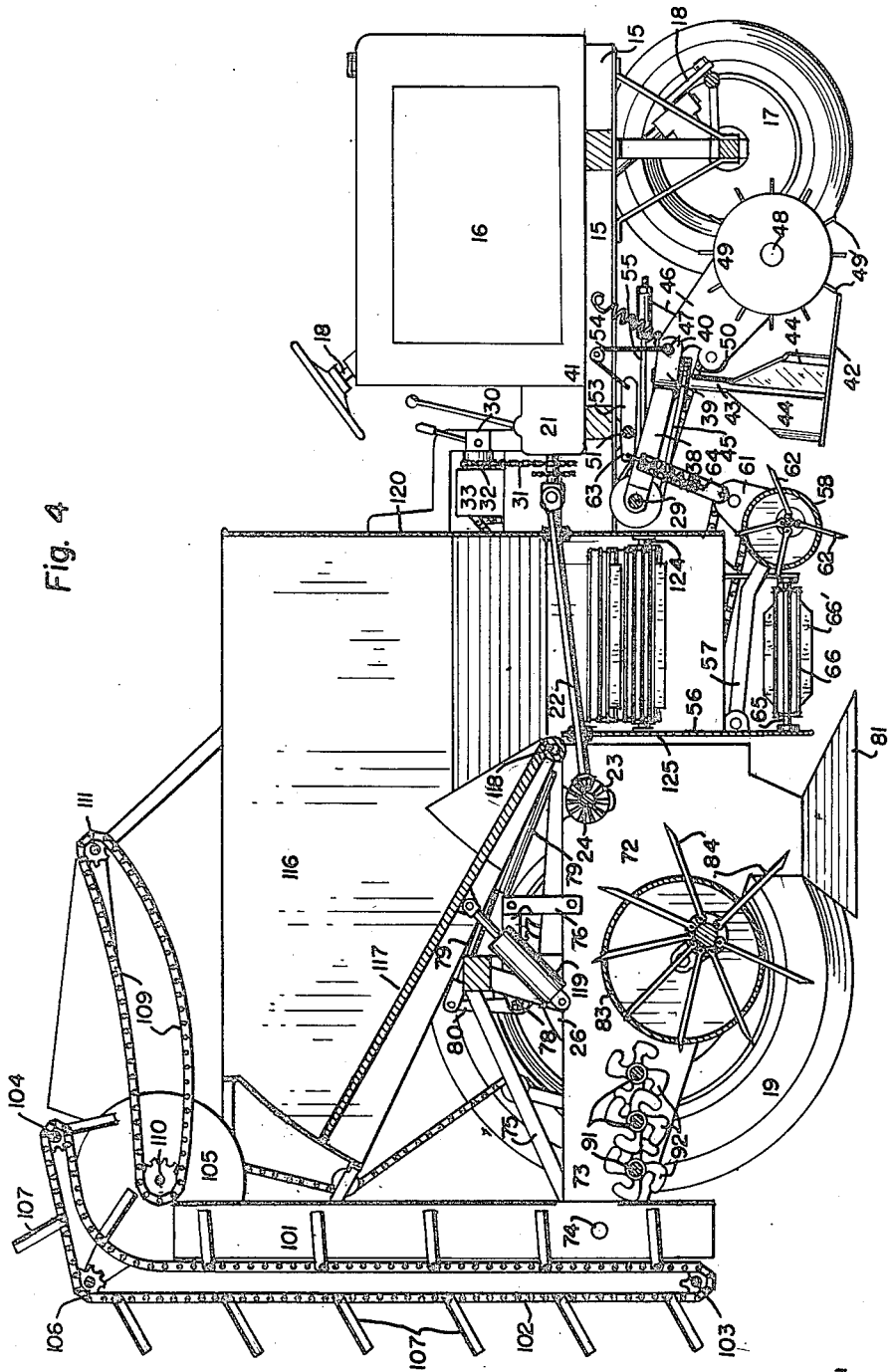

July 24, 1956　　　　J. SISHC　　　　2,755,614
BEET TOPPING DEVICE HAVING TOP DISPOSAL MEANS
Filed March 19, 1952　　　　6 Sheets—Sheet 5

Inventor
JULIUS SISHC
Attorney

INVENTOR.
JULIUS SISHC

United States Patent Office 2,755,614
Patented July 24, 1956

2,755,614

BEET TOPPING DEVICE HAVING TOP DISPOSAL MEANS

Julius Sishc, Torrington, Wyo.

Application March 19, 1952, Serial No. 277,451

3 Claims. (Cl. 56—121.46)

This invention relates to powered machines for the harvesting of sugar beets and analogous root crops from their positions of field growth and has as an object to provide an improved such machine operable in a single transit along the crop rows to efficiently top the crop elements in their positions of growth, to lift the topped crop elements from the ground, and to separately collect and separately deliver the parted crop components.

A further object of the invention is to provide an improved construction and operative correlation of topping means, top collecting and delivering means, beet lifting means, and beet collecting and delivering means served by said lifting means, in and to constitute a unitary powered beet harvester.

A further object of the invention is to provide an improved tractor-type beet harvester characterized by topping means efficiently reactive to beet size and ground projection in serving relation with beet top collecting and delivering means and an independently and selectively adjustable beet lifting, collecting, and delivering unit operatively correlated with such topping means.

A further object of the invention is to provide improved topping means in powered relation with a tractor-type beet harvester.

A further object of the invention is to provide an improved beet lifting, collecting, and delivering unit in powered relation with a tractor-type beet harvester.

A further object of the invention is to provide an improved tractor-type beet harvester that is practical of operation under varying field conditions, that is economical and efficient in performance of the functions peculiar to beet harvesting, that is operatively adaptable to accommodate the vagaries of crop growth, and that is effective to accomplish the complete harvesting cycle in a single crop row transit.

Figure 1:
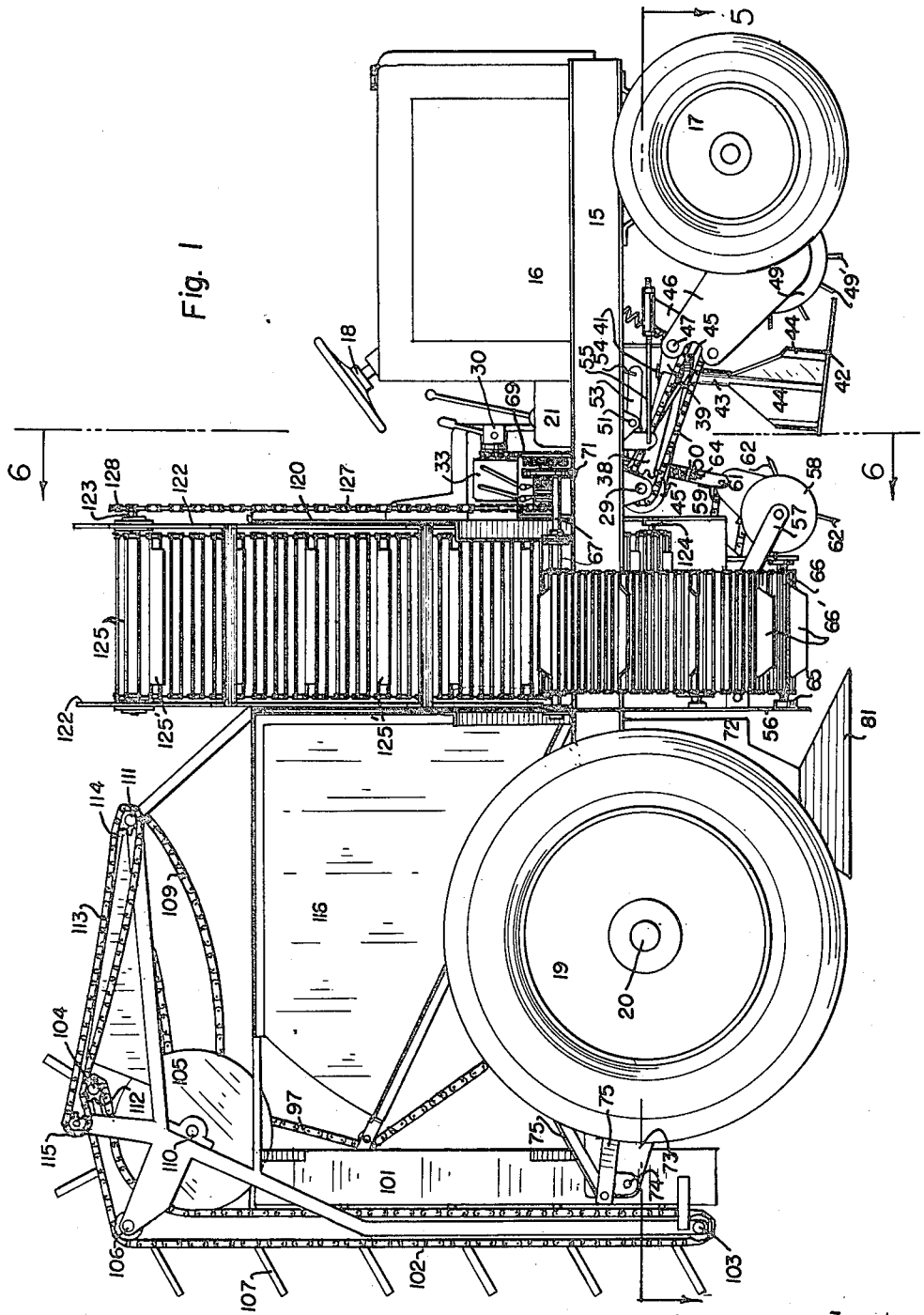
Figure 2:
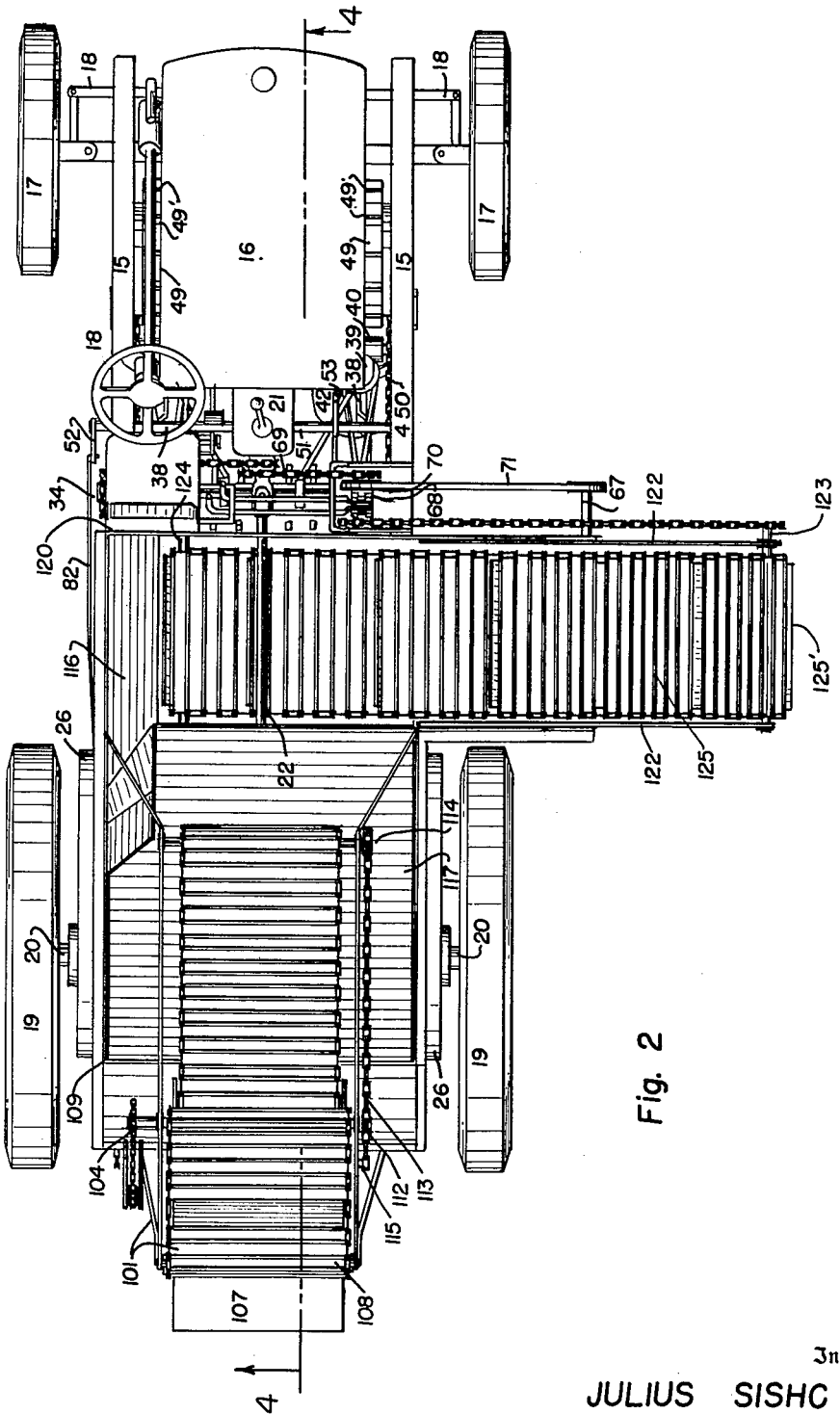
Figures 3, 10:
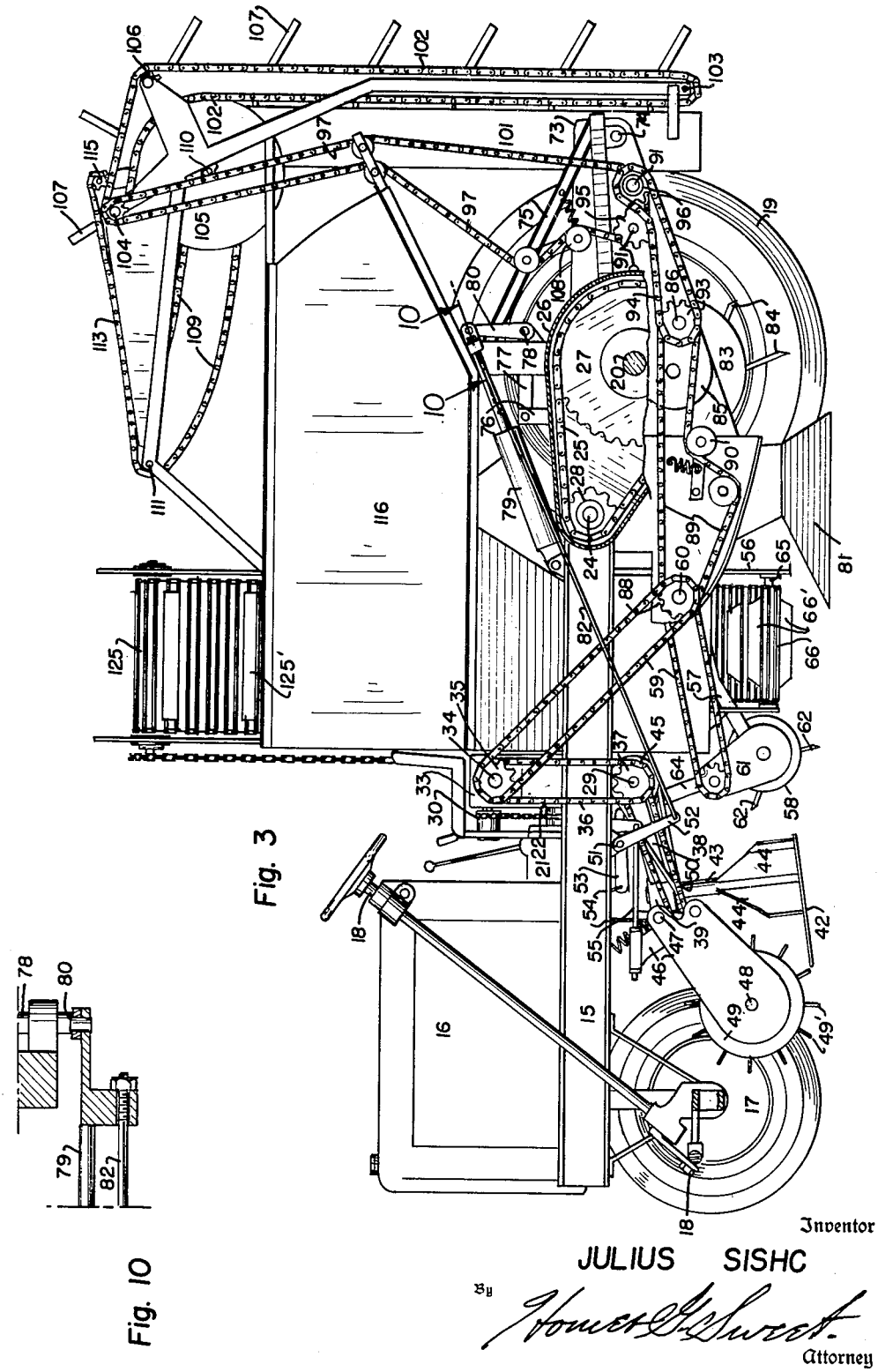
Figures 5, 8, 9:
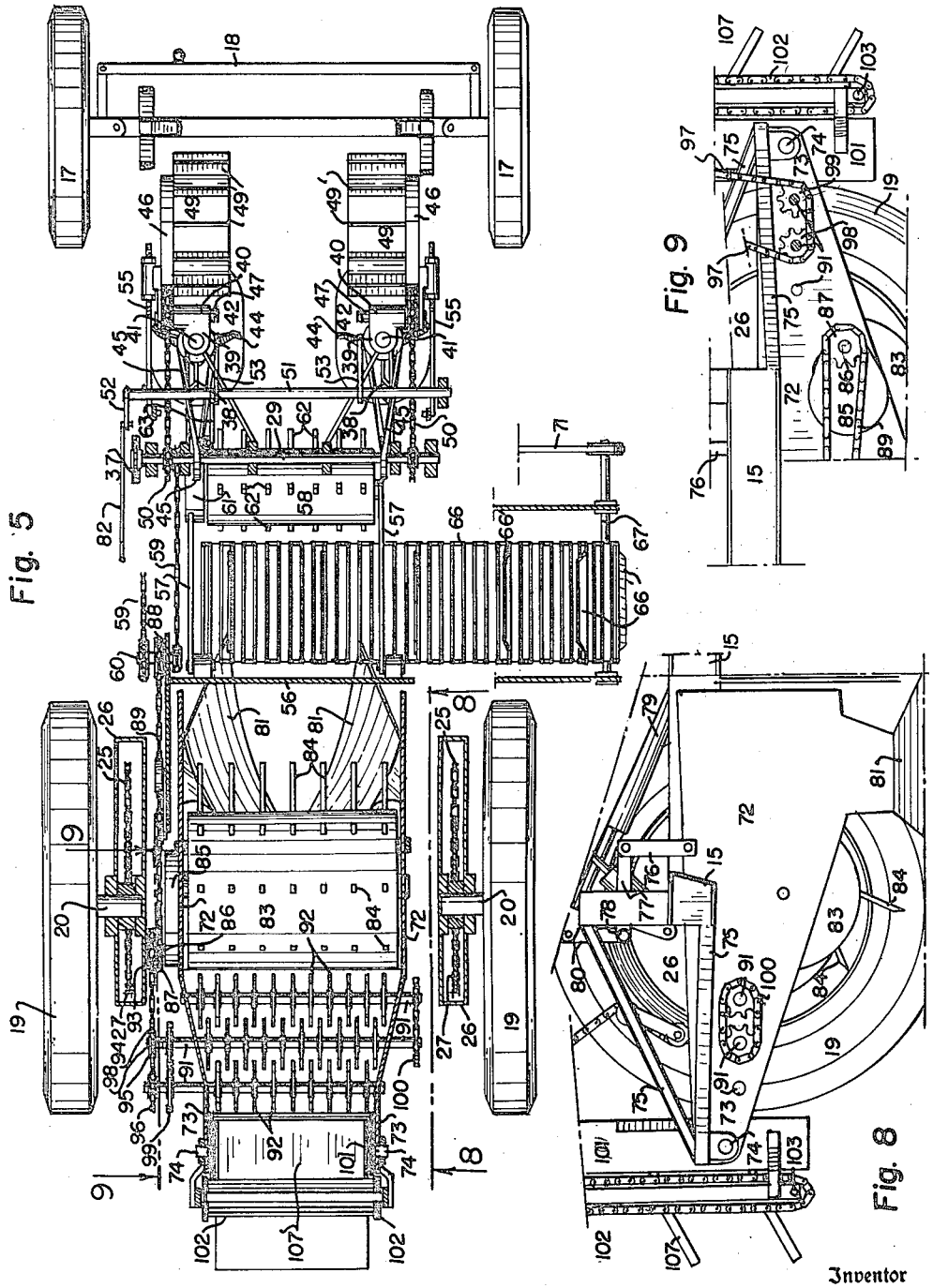
Figure 6:
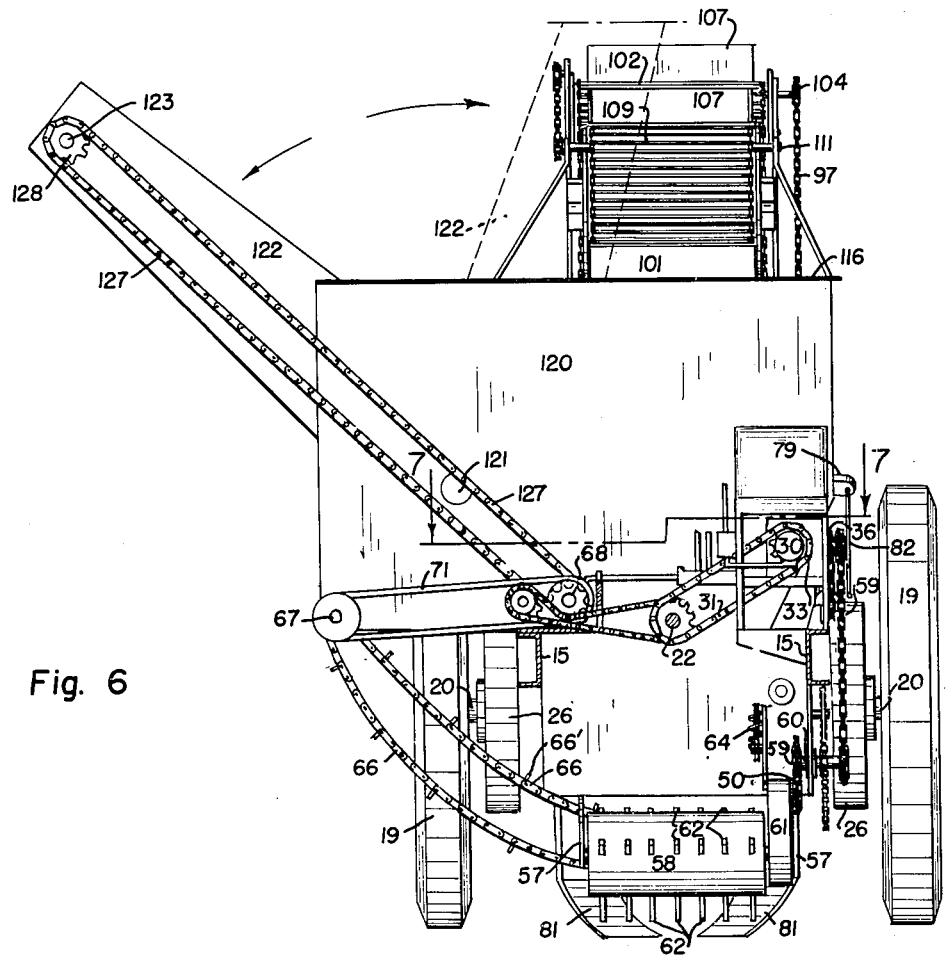
Figure 7:
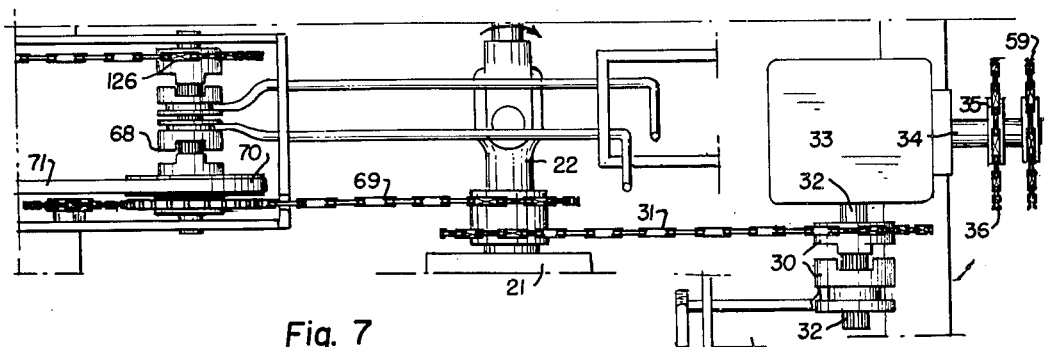

With the foregoing and other objects in view, my invention consists in the construction, arrangement, and combination of elements hereinafter set forth, pointed out in my claims, and illustrated by the accompanying drawings, in which:

Figure 1 is a side elevation of a typical embodiment of the invention ready for practical use. Figure 2 is a top plan view of the organization according to Figure 1. Figure 3 is an elevation, partly in section and with certain parts broken away to show otherwise concealed relationships, of the side of the organization opposite to that shown in Figure 1. Figure 4 is a vertical section longitudinally of the assembly taken substantially on the indicated line 4—4 of Figure 2. Figure 5 is a section laterally and horizontally through the assembly taken substantially on the indicated line 5—5 of Figure 1. Figure 6 is a transverse, vertical section taken substantially on the indicated line 6—6 of Figure 1. Figure 7 is a fragmentary, detail, plan view, on a relatively enlarged scale, of certain connections and controls as viewed from the zone indicated by the line 7—7 of Figure 6. Figure 8 is a fragmentary, detail section taken substantially on the indicated line 8—8 of Figure 5. Figure 9 is a fragmentary, detail section taken substantially on the indicated line 9—9 of Figure 5. Figure 10 is a fragmentary, detail section taken substantially on the indicated line 10—10 of Figure 3.

The harvesting of sugar beets, and analogous root crops, from the fields of their growth and the conditioning of the crop for subsequent use and processing conventionally include lifting or pulling of the individual crop element from the ground, severing of the top growth and a portion of the crown from the element, collection and segregation of the topped elements, and collection and separate segregation of the severed top growth and crown segments, an important consideration in such harvesting and crop conditioning being the amount or proportion of the element removed as a crown segment with the top growth. Machines and implements of various types and constructions have been developed for and applied with less than full satisfaction to the harvesting of sugar beets for the more or less complete elimination of the hand labor hitherto particularly applied to the topping operation, and it is to the provision of an improved such machine or implement free from the shortcomings, inadequacies, and disadvantages of its predecessors that the instant invention is directed.

As shown in the drawings, a self-propelled vehicle of tractor type suitable for the mounting, translation, and operative powering of the improved harvester is represented as comprising a rigid frame 15 mounting an internal combustion engine 16, spaced, parallel wheels 17 steerable by means 18 supporting the forward end of said frame, and spaced, parallel wheels 19 in driven relation with the engine 16 on aligned stub axles 20 through any suitable arrangement of means and connections supporting the rearward end of said frame, all of which may be conventional construction not in and of itself a part of the invention. As illustrated, drive of the wheels 19 by means of the engine 16 is conveniently had through a usual change speed gear box 21 from which a driven or propeller shaft 22 extends longitudinally and rearwardly of the frame 15 to drive, as through meshed bevel gears 23, a shaft 24 journaled on and transversely of said frame forwardly from and to parallel the stub axles 20, so that chain drives 25 exteriorly adjacent each side of the frame 15 within suitable housings 26 may interlink a sprocket 27 fixed to each of the stub axles 20 with a coplanar sprocket 28 on the corresponding end of the shaft 24 for effective transmission of power from the engine 16 to said stub axles and the wheels carried thereby.

Spaced apart laterally and beneath a forward portion of the harvester, duplicate topping assemblies adapted to similarly and simultaneously operate upon adjacent crop rows straddled by the harvester wheels are operatively mounted upon and powered from a shaft 29 journaled for rotation transversely of and beneath the frame 15 just rearwardly of the gear box 21. Through a manually-shiftable clutch 30, a chain drive 31 from a sprocket on the shaft 22 drives a shaft element 32 outstanding from a gear box 33 at one side of the frame to spacedly parallel the shaft 22, and a shaft element 34 outstanding from said gear box 33 laterally of the frame 15 in perpendicular, constantly-driven relation with the element 32 spacedly parallels the shaft 29 and carries a sprocket 35 connected by means of a chain 36 with a coplanar sprocket 37 on the corresponding end of said shaft 29, whereby to transmit power from the engine 16 to and for selective rotation of said shaft 29.

Each of the independently-operable topping assemblies is developed on and for oscillation with a yoked arm 38 which is hinged at its rearward, yoked end to the shaft 29 and extends forwardly thence for free oscillation in a vertical arc. At its free, forward end the arm 38 rigidly engages and mounts a fitting characterized by a tubular boss 39 disposed with its axis substantially perpendicular to the plane of the arm and a bearing 40 fixed to the forward area of said boss in axially-perpendicular relation therewith, and a cylindrical stem 41 is fixed at its upper end in and through the boss 39 to project thence below the arm 38 for the positioning and support of a relatively-wide, flat topping blade 42 fixed adjacent its rearward edge to the lower end of and in perpendicular relation with said stem, thus to dispose the blade 42 parallel to and beneath the plane of the arm 38 with its sharp, preferably-arcuate, forward margin projected forwardly along a crop row in the direction of harvester travel and at a forwardly-convergent inclination to the horizontal when approached to the ground surface. A kicker member in the form of a tubular sleeve 43 furnished with angularly-related vanes 44 fixedly extending radially therefrom is rotatably mounted on the stem 41 portion between the boss 39 and blade 42 and a belt and pulley drive 45 between the shaft 29 and the upper end of said kicker is provided in an arrangement effective to rotate the kicker vanes 44 through the forward arc of their orbit in a direction to impel material from the blade 42 and toward the longitudinal median line or plane of the harvester. An obtusely-angled bell crank 46 is provided with a pin 47 fixedly outstanding perpendicularly from the bell crank plane adjacent the apex of the crank angle and adapted for journaled engagement through the bearing 40, whereby to mount said bell crank on the arm 38 forward end fitting for oscillation through a vertical arc at the outer side of said arm about the pin 47 axis with the interior angle of the crank opening forwardly of the assembly, and a spindle 48 spacedly parallels said pin 47 in a fixedly perpendicular relationship with the free end of the bell crank longer, forwardly-directed arm to rotatably mount a gauge wheel 49 in position for rolling travel along a crop row above and in advance of the blade 42, said wheel 49 preferably being of drum type with a wide tread furnished with an angularly-spaced succession of radially-outstanding cleats or ribs 49'. A chain and sprocket drive 50 operatively between the shaft 29 and gauge wheel 49 is effective to reflect shaft 29 rotation as simultaneous and unidirectional rotation of the wheel 49. To control and regulate the vertical attitude of the arm 38 and associated topping assembly elements, a rock-shaft 51 is mounted for oscillation about its axis transversely of and below the frame 15 at the rear end of the engine 16 and is operatively linked through the agency of a lever 52 fixed radially of one of its ends to the extensible element of an hydraulic ram unit as hereinafter more particularly described, so that extension of said unit acts through the lever 52 to rock the shaft 51 in one direction and retraction of said unit operates to rock the said shaft in the opposite direction. In alignment with the arm 38, a lever 53 fixedly and perpendicularly outstands from the rock-shaft 51 in substantial registration with and above the arm 38, and a flexible link, such as a length of chain or cable 54, engages over and about an upwardly-disposed, frame-mounted roller between the arm and lever ends to reflect shaft 51 oscillation as oppositely-directed altitudinal adjustment of the arm 38 about its hinge mounting on the shaft 29. Operatively correlating the gauge wheel 49 altitudinal attitude with that of the arm 38 forward end, a tie rod 55 is hinged at one end to a frame-fixed point in advance of and below the shaft 29 axis and extends thence forwardly in parallel with the line of vehicle travel to adjustable connection through a suitable swivel joint with the free end of the bell crank 46 arm upstanding above the crank mounting pin 47.

Operatively mounted on the shaft 29 as shown and described and laterally spaced apart in conformity with the spacing between adjacent crop rows, the two topping assemblies of the harvester are arranged to operatively register with and travel along such crop rows as an incident of vehicle travel through the field with the wheels 17 and 19 at the outer sides of the rows. The arms 38 of the separate assemblies being similarly connected through their respective flexible links 54 and levers 53 with the rock-shaft 51, oscillation of the latter through the agency of the lever 52 similarly and simultaneously affects the altitudinal attitude of both topping assemblies; rearward oscillation of the depending lever 52 being availed of to elevate the topping assemblies about their common hinge axis and out of operative relation with the crop rows during turning and non-operative travel of the vehicle and forward oscillation of said lever being utilized to lower the topping assemblies into like positions of minimum spacing of their blade 42 leading edges relative to the ground surface, in which latter position each blade 42 is disposed to engage and sever a minimum segment from the crop elements of least crown protrusion above the ground. It is the function of each gauge wheel 49 to roll over and altitudinally follow the contour variations of the crop element crowns in the row being worked by its topping assembly and to correspondingly altitudinally adjust its associated blade 42 edge for removal of appropriate crown segments from the crop elements of varying size and crown elevation, it being requisite that a greater crown segment be removed from the larger, usually higher, crop elements than is appropriate in the case of the smaller crop elements, and this is automatically accomplished by virtue of the gauge wheel mounting and operative linkage, while at the same time the powered rotation of the gauge wheel and the presence on the wheel tread of the cleats or ribs 49' combine to establish effective contact of the wheel tread with the crop element crowns in spite of top growth and to firm the crop element crown against the shearing action of the blade 42. With the blade 42 of the topping assembly in its position of minimum spacing from the ground as determined by the linkage 51—54 in reaction to lever 52 oscillation, the free end of the bell crank 46 upstanding arm is adjusted along the tie rod 55 to rock the bell crank about the axis of its mounting pin 47 and into an altitudinal spacing of the associated gauge wheel 49 perpihery from the underlying cutting edge of its blade 42 appropriate for topping of the lower, and usually smaller, crop elements; thus conditioning the topping assembly for practical use. Carried by the bearing 40 with its upstanding arm linked to a frame-fixed point by means of the tie rod 55, the bell crank 46 and its associated elements, including said rod 55, moves with the free end of the arm 38 as the latter is altitudinally adjusted through the agency of the lever 52 into and out of operative relation of the topping assembly elements with a crop row. When in the operative position of blade 42 minimum spacing from the ground, the arm 38 free end may rise with its associated elements, by virtue of the flexible link 54, in reaction to elevational influence transmitted from the wheel 49 through the bell crank 46 and its mounting pin 47, so that, as the gauge wheel 49 rides up and over a relatively larger and more elevated crop element crown in its translatory path, the crank arm mounting and linkage functions to elevate the associated arm 38 free end and correspondingly raise the blade 42 cutting edge for appropriate engagement with the crop element which has occasioned the altitudinal adjustment, all without disturbing the primary adjustment had through the agency of the lever 52. Since the tie rod 55 in its adjusted engagement with the upstanding arm of the bell crank 46 hinges on a pivot forwardly of and below the pivotal axis of the arm 38 when the topping assembly elevates in reaction to gauge wheel 49 rise, a suitable proportioning of arm 38, tie rod 55, and bell crank 46 arm lengths is effective to lift the arm 38 and its blade 42 a distance proportioned to and less than that through which the gauge wheel 49 is elevated by the crop element, thereby automatically widening the space between the wheel 49 periphery and the blade 42 cutting edge when and as the topping assembly acts upon the more elevated crop elements and correspondingly varying the depth of crown segment removed by the blade. As the crown segments are cut from the successive crop elements by the blade 42, they pass rearwardly along the blade upper surface and to engagement by the power-rotated kicker member, whereof the vanes 44 function to flip the segments from the blade and laterally of the assembly as a windrow positioned for subsequent collection by following agencies of the harvester; rotation of the kickers carried by the separate assemblies of the topping unit being arranged to direct the top segments from said assemblies into a common windrow therebetween and beneath the longitudinal median line of the harvester.

A plate 56 fixedly depends vertically from and bridges transversely between sides of the frame 15 just forwardly of the wheels 19 with its lower margin spaced upwardly from and to clear the support plane of the vehicle and brackets 57 are hinged at their rearward ends to the forward, lower face of said plate for oscillation in spacedly-parallel vertical arcs perpendicular to said plate and in extension forwardly therefrom. Operatively carried by and bridging transversely of the frame 15 between forward ends of said brackets 57, a pickup reel characterized by a drum 58 is mounted for rotation about an axis below and spacedly paralleling the shaft 29, and a chain and sprocket drive 59 from the shaft element 34 leads about a shaft 60 aligned with the bracket 57 hinge axis to and through a reversing and speed-reducing transmission 61 at one end of the reel to effect power rotation of the latter in a direction opposite to that of wheel 19 rotation during forward travel of the harvester. The pickup reel may be of any particular construction and mode of operation appropriate to accomplish its purpose of elevating and rearwardly translating severed crop element material windrowed in its path by and between the topping assemblies, and is conventionally shown as a right cylindrical drum 58 rotatable about its axis in association with tines 62 eccentrically pivoted within the drum and slidably projecting through drum wall openings for automatic variation of their length projection beyond the drum wall as an incident of drum rotation; the illustrated arrangement being such as will function to develop major tine 62 extension outwardly of the associated drum 58 during lower and forward arcs of drum rotation and a retraction of said tines to a condition of minimum such extension as the drum passes through the upper and rearward arcs of its travel, whereby to condition the tines in their association with the drum to rake forwardly through, engage with, and elevate the windrowed crop element material in its path as the harvester travels forwardly with the pickup reel rotating in opposition to the harvester wheels and to retract said tines out of engagement with and for release of the elevated material as the latter is carried over the drum and rearwardly of the harvester. Altitudinal adjustment of the pick-up reel is preferably correlated with that of the topping assemblies through appropriate connections between the brackets 57 and elements movable with the shaft 51 in reaction to lever 52 oscillation, an arrangement effective for such purpose being illustrated as consisting of arms 63 fixedly outstanding rearwardly from the shaft 51 for oscillation in a vertical plane longitudinally of the frame 15 above the brackets 57 and length-adjustable, resiliently-yieldable links 64 connecting between forward ends of the brackets 57 and corresponding rearward ends of the said arms 63.

Mounted for rotation about its axis on and to project perpendicularly and forwardly from the lower corner of the plate 56 behind and at the drive end of the pick-up reel, a roller 65 operatively engages and supports one end of an endless, chain or link type, conveyor web 66 which slackly spans upwardly and laterally of the assembly rearwardly adjacent the pick-up reel to supported engagement of its other end with a roller 67 operatively paralleling said roller 65 outwardly beyond and slightly above the remote side of the frame 15, thus disposing said web 66 to receive, elevate, and laterally translate crop element material delivered by and over the pick-up reel. A shaft 68 spacedly paralleling the propeller shaft 22 is reversely chain-driven by the latter, as at 69, and mounts a clutch-engageable pulley 70 in driving relation with a belt 71 which extends outwardly and laterally of the assembly to engage with and rotate a pulley on the corresponding end of the roller 67 shaft, whereby to power the web 66 for upward and laterally-outward travel of its upper run and consequent delivery of material received upon and carried by said web over the elevated roller 67 and laterally of the harvester. Facilitative of its function, the conveyor web 66 is preferably furnished with laterally-disposed cleats 66' spaced apart therealong in a usual manner.

Ground-extraction and collection of the topped beet bodies is accomplished immediately subsequently to the topping operation by correlated means and elements associated in and constituting a unit carried by and for selective altitudinal adjustment relative to the harvester frame rearwardly of the plate 56 and between the frame 15 side members mounting the stub axles 20. In any appropriate rigid construction, a skeletonized frame 72, of hollow box type, is formed with side wall upper corner extensions 73 fixedly outstanding longitudinally and rearwardly of the frame 15 to hinged connection at 74 with rigidly-associated structure 75 rearwardly extending and terminating the frame 15 side members, and like points of the frame 72 side wall upper margins are hingedly connected by means of links 76 with the free ends of arms 77 fixedly and forwardly outstanding radially from a rockshaft 78 journaled in and bridging between structure rigidly carried by the frame 15 in upwardly spaced, parallel relation with the stub axles 20, thus to mount the frame 72 on and within the rearward portion of the frame 15 for relative altitudinal adjustment in reaction to oscillation of the shaft 78. Control of the frame 72 altitudinal attitude is expediently had through an hydraulic ram unit 79 included for selective actuation in the conventional pressure system of the harvester, which ram unit is end-hinged to and operatively engages between the free end of a lever 80 fixedly upstanding radially from one end of the rock-shaft 78 and a frame-fixed point or member forwardly of the harvester from said lever, and on the same side of the assembly as the lever 52, so that extension of the ram 79 and consequent upward rocking of the arms 77 operates to elevate the frame 72 and retraction of said ram operates to lower said frame. Rigidly mounted upon forward side portions of the frame 72 and extending below and forwardly from such mounting, puller shoes, or plows, 81 of appropriately effective design are spaced apart laterally of the assembly to operatively register with the crop rows to be harvested, and hence in rearwardly-spaced alignment with the topping assemblies carried forwardly of the wheels 19. The shoes 81 are designed to plow through the ground of their crop rows and lift the topped beet bodies from their positions of growth, in simulation of conventional beet-pulling practices, and are hence shaped and rearwardly and upwardly curved for elevating engagement beneath the beet bodies, and with and under the bulges thereof, in a somewhat conventional manner, a feature of the plow design and arrangement in the present installation being a direction and opposition of lateral plow curvature effective to impel the extracted bodies laterally and inwardly of the harvester for deposit in a common windrow between the furrows from which they have been lifted and along the center of the harvester travel path. Powering the lever 52 for elevation of the topping assemblies and pick-up reel in correlation with frame 72 elevation, a pull-rod 82 operatively connects between the extensible end of the ram unit 79 and the free end of said lever.

Transversely of the frame 72 and in an operative spacing rearwardly from the shoes 81, a pick-up reel 83, functionally and structurally similar to the reel associated with the topping unit and characterized by tines 84 extensible and retractible as an incident of reel rotation, is revolubly mounted in bearings carried by the frame 72 side members and is arranged rearwardly of and across the space between the shoes 81 for maximum extension of its tines 84 during lower and forward arcs of its rotation and minimum tine extension during upper and rearward arcs of such rotation in an altitudinal adjustment effective to sweep the tine tips along the ground surface when the frame 72 is lowered for extractive engagement of the shoes with and beneath the crop row element bodies. Power drive of the reel 83 to effect its rotation in a direction opposite to that of the harvester wheels 19 during forward travel of the assembly may be variously accomplished, but it is convenient and feasible to utilize a chain and sprocket drive from the shaft 60 for such purpose, as illustratively indicated. In the reel drive arrangement shown, a reversing and speed-reducing transmission 85 at one end of and in driving relation with the reel 83 includes a shaft element 86 outstanding in spaced parallelism with the shaft 60 to carry a sprocket 87 coplanar with a sprocket 88 on said shaft 60, so that an endless chain 89 interlinking the sprockets 87 and 88 through a tensioning device 90 operates to reflect shaft 60 rotation as corresponding rotation of the shaft element 86 and consequent reverse rotation of the reel 83. The reel 83 functions by virtue of its rotation and through the agency of its tines 84 to engage with, elevate, and rearwardly translate the extracted crop element bodies windrowed in its path of forward travel by the shoes 81, and to deliver such material to subsequent conditioning and handling operations characterizing the harvester.

With their axes determining a common, generally-horizontal plane at a level between the axis and upper arc of the reel 83, similar rods 91, illustrated as three in number, are journaled for rotation in and to span transversely of the frame 72 as a spacedly parallel succession trailing said reel and parallel to the reel axis. Throughout its length intercepted between sides of the frame 72, each of the rods 91 mounts a succession of like peripherally-discontinuous disks or wheels 92 spaced apart longitudinally of and to rotate with the associated rod in such staggered relation on adjacent rods as will accommodate the disks 92 of the center rod 91 between the marginally-overlapping disks of the rods 91 at either side thereof, thus to constitute upper margins of said disks 92 as a shaking screen over which the topped beets delivered by the reel 83 may be translated and agitated for removal of adherent soil as the said rods 91 are caused to rotate in the same direction as said reel, it being manifest that the leading rod 91 is so spaced rearwardly from the reel 83 as to receive and rearwardly translate the topped beets elevated by and discharged rearwardly from the said reel. The power drive of the reel 83 may be expediently applied to rotate the rods 91 in the appropriate direction, a second sprocket 93 on the shaft element 86 of the reel drive serving to drive an endless chain 94 which engages under a sprocket 95 fixed to the projecting end of the center one of the rods 91 and about an idler sprocket 96 loosely carried by the projecting end of the rearmost rod 91, thus to rotate the center rod 91 in the desired direction. An elevator and conveyor drive, hereinafter more particularly described, includes a chain 97 in driven relation with a sprocket 98 on the center one of the rods 91 and in driving relation with a similar sprocket 99 on the rearmost rod 91, whereby to couple said rods for synchronous rotation, and a chain and sprocket drive 100 between ends of the foremost and center rods 91 projecting beyond the frame 72 side remote the chain 94 operates to rotate said foremost rod synchronously with the other rods of the set. Thus the drive to the pick-up reel 83 is applied to operate the shaking screen comprised from the rods 91 and their disks 92, so that topped beets delivered by and rearwardly over said reel 83 to said screen are rolled, tumbled, and agitated thereon to detach and screen out any adhering soil while the said beets are translated by the screen rearwardly thereacross.

Confined between and guided by the rearwardly-convergent walls of the frame 72 wherein the rods 91 are journaled, the beets received upon the shaking screen are delivered by and from said screen to the lower end of a conveyor box 101 vertically upstanding rearwardly adjacent said screen in fixed relation with the frame 15 and superstructure carried thereby. The box 101 is open at each end, open to the rear throughout its height, closed at its sides, and closed throughout its height at its forwardly-directed face save for an opening at the level of the shaking screen through which the beet charge may be delivered from the latter. Cooperating with the box 101, an endless conveyor web 102, preferably of chain or link type, is mounted for travel about a shaft 103 rotatably carried rearwardly adjacent the lower end of said box and about a spacedly-parallel shaft 104 above and forwardly of the harvester from the upper end of the box with the forward run of the web curved over and supported by upper and rearward arcs of guide wheels or rollers 105 rotatable in vertical planes paralleling the box 101 sides at the upper end of said box and the rearward run of said web engaged over a direction-changing idler 106, thus to dispose said web for travel of its forward run upwardly from the shaft 103 along, parallel to, and rearwardly adjacent the box 101 in effective closing relation with the open rearward face of said box and thence forwardly about margins of the wheels 105 and across the upper end of the conveyor box. Conditioning the web 102 to accomplish its function of elevating the topped beets delivered to the box 101 lower end by the shaking screen, tray-like members 107 outstand in spaced succession from and across the plane of said web in such size and particular association with the web as serve to dispose the said members 107 for travel within and upwardly along the box 101 as spaced shelves or baffles individually and laterally obstructing the box interior at a slight upward and forward inclination relative to the associated web in a cooperation with said box effective to lift the beets incoming to said box upwardly therealong as the inner run of the web 102 is caused to ascend along the box. The chain 97 heretofore mentioned is utilized to drive the web 102 in the desired direction through engagement of said chain with a sprocket carried on the appropriate end of the web-mounting shaft 104, thus to reflect powered rotation of the center rod 91 through the sprocket 98 and chain 97 as similarly-directed, simultaneous rotation of the shaft 104; tensioning means 108 being provided in appropriate engagement with the chain 97 to adapt the latter for functioning in all altitudinally-adjusted positions of the frame 72.

As the forward run of the web 102 is caused to move upwardly and forwardly over the wheels 105, the members 107 carried by the web are tilted to incline their planes forwardly and downwardly as a consequence of such change in the direction of web travel, thus to release the beet charges carried by said members for delivery from the elevator forwardly and downwardly of the harvester and to a chain or link type conveyor web 109 mounted for travel longitudinally of the harvester about a rearward shaft 110 axially coincident with the wheels 105 and a spacedly-parallel, forward shaft 111 mounted for rotation in superstructure carried by the frame 15; it being operatively significant that the mounting of the web 109 on the shaft 110 is rotatively independent of the coaxial wheels, 105. It is convenient to apply the power drive through the chain 97 to effect travel of the upper run of the web 109 forwardly of the harvester, for which purpose a sprocket 112 on the end of the shaft 104 remote from the chain 97 engages the under run of a chain 113 which links a sprocket 114 on the corresponding end of the shaft 111 with an idler sprocket 115 mounted for rotation rearwardly adjacent the said sprocket 112.

The conveyor web 109 overhangs, and delivers at its forward end within, a hopper 116 fixedly carried by the frame 15 above the altitudinally-adjustable frame 72 and characterized by a forwardly and downwardly inclined bottom panel 117 tiltable about a hinge axis 118 at its lower, forward edge under the influence of a selectively extensible and retractible hydraulic ram 119 pivotally interlinking said panel with elements fixed to the frame 15, so that extension of said ram may function in an obvious manner to increase the pitch of the hopper bottom panel for consequent forward and downward shift of the hopper charge. The wall of the hopper 116 at the side of the harvester mounting the chain 97 extends forwardly to join and close against the hopper forward wall 120 which bridges transversely of the frame 15 in a vertical disposition paralleling and spaced forwardly from the hinged forward margin of the bottom panel 117, skirt extensions from and constituting lower portions of said interconnecting hopper side and forward walls cooperating with the upper portion of the plate 56 to define a conveyor box opening laterally of the hopper at its forward end in registration with an opening through the hopper side wall on the same side as and above the discharge end of the conveyor web 66. Hinged at its open, lower end, as at 121, to swing laterally of the harvester in registration with the conveyor box at the hopper forward end and through the opening in the hopper side wall about an axis longitudinally of the harvester, a yoke constituted with like, spacedly-parallel arms 122 rotatably mounts a shaft 123 transversely of its free outer end and parallel to the yoke hinge axis in complementary relation with a parallel shaft 124 horizontally bridging the inner, or closed, end of the hopper conveyor box, so that a conveyor web 125, of chain or link type, engaged with and to span slackly between said shafts 123 and 124 is disposed for travel longitudinally of the hopper conveyor box and associated yoke, transversely of the harvester, as a first, generally-horizontal reach laterally filling the hopper conveyor box between the depending skirt of the hopper forward wall 120 and the plate 56 below the forward edge of the hopper inclined bottom panel 117 and hence in position to receive and translate the material charged within the hopper, and a second reach laterally filling the yoke transversely of the harvester. The yoke carrying the second reach of the conveyor web 125 is alternatively positionable about its pivotal axis 121 to outstand at an upward and outward inclination laterally from the harvester in an operative disposition effective for delivery of material entrained by the conveyor web 125 to the bed of a vehicle moving along a path paralleling that of the harvester, such disposition being indicated by full lines in Figure 6, or to incline upwardly laterally of the harvester in an inoperative disposition facilitating non-harvesting travel of the assembly, as represented by the broken line showing of Figure 6. Enhancive of its functioning, the web 125 is preferably furnished with laterally-disposed cleats 125' spaced apart therealong in accordance with usual practice. The conveyor web 125 is expediently powered from the shaft 68 by means of a sprocket 126 on and clutch-connectible to said shaft and a chain 127 linking said sprocket 126 with a sprocket 128 on the corresponding end of the shaft 123 in a length appropriately tensioned for operation when the yoke carrying the second reach of the conveyor web 125 extends laterally from the harvester in the operative disposition of said web.

Thus, in a single, unitary powered organization susceptible of operation, regulation, and control by a single operator, the instrumentalities requisite for the efficient harvesting of sugar beets, and analogous crops, are combined and operatively correlated to complete the harvest, with separate collection and segregation of the severed top and body elements of the crop, in a single transit along the crop rows. The topping assemblies, in an initial adjustment relative to the harvester frame and the harvester supporting surface, are free for self-adjustment to regulate the location and depth of topping cut with respect to the individual crop elements and, together with their associated pick-up reel, are susceptible of adjustment into and out of operating relation with the crop rows at the pleasure of the operator. Powered and carried by the harvester assembly in trailing relation with the topping and top material collecting means, the body extracting and collecting agencies are integrated and correlated in a unit susceptible of altitudinal regulation between operative and inoperative positions at the will of the operator together with the topping assemblies, and the separate conveyors for the top material and crop element bodies arranged for delivery laterally of the travel path notably enhance the utility and efficiency of the harvester.

Since changes, variations, and modifications in the form, construction, and arrangement of the elements shown and described may be had without departing from the spirit of the invention, I wish to be understood as being limited solely by the scope of the appended claims, rather than by any details of the illustrative showing and foregoing description.

I claim as my invention:

1. In a beet harvester comprising a mobile, self-powered vehicle having a main frame, beet topping units laterally spaced apart beneath and separately hinged for altitudinal adjustment relative to a forward portion of said frame, a pick-up reel for the collection of severed beet tops hinged for altitudinal adjustment relative to and rotatable about an axis transversely of said main frame in close trailing relation with said topping units, means for rotating said reel to advance its ground-adjacent arc in the direction of harvester travel, and means engaged with said topping units and said reel for the simultaneous altitudinal adjustment thereof.

2. The organization according to claim 1, wherein each of the beet topping units is characterized by an arm hinged at its rearward end for oscillation in a vertical arc about an axis fixedly associated with and transversely of the main frame to extend forwardly and longitudinally of said frame, the said pick-up reel is carried by the forward ends of brackets hinged for oscillation in parallel vertical arcs to and extending forwardly from members fixedly associated with the main frame, and the means for altitudinally adjusting the topping units and pick-up reel comprises a rock-shaft journaled for oscillation about its axis transversely of and beneath the main frame, arms fixed to and extending radially from said rock-shaft rearwardly of the harvester to spacedly overhang said brackets, length-adjustable, resiliently-yieldable links connecting the free ends of said arms with said brackets, forwardly-directed arms fixed radially of said rock-shaft to overhang the hinged arms of the beet topping units, a direction-changing roller pivotally related with the main frame above the free end of each said forwardly-directed arm, a flexible connection engaged over said roller and between the free end of the associated forwardly-directed arm and corresponding topping unit hinged arm well ahead of the hinge axis of the latter, and a lever radially of one end of said rock-shaft for the selective oscillation thereof.

3. The organization according to claim 1, wherein each of said topping units comprises an arm hinged at its rearward end beneath and to extend longitudinally and forwardly relative to said frame, a stem fixedly depending from the forward end of said arm, a topping blade fixed to and projecting forwardly from the lower end of said stem, a radially-bladed kicker on and rotatable about said stem between said blade and arm, a gauge wheel rotatable on a spindle paralleling the arm hinge axis and overhanging the blade forward margin, said spindle being hingedly associated with the arm forward end for indepent, vertical arc oscillation, a linkage between said spindle and frame effective to increase the spacing of the blade forward margin relative to the gauge wheel periphery as the arm free end is elevated, and means for synchronously driving said gauge wheel and kicker.

References Cited in the file of this patent

UNITED STATES PATENTS

| Number | Name | Date |
|---|---|---|
| 1,463,078 | Gilmore et al. | July 24, 1923 |
| 1,748,746 | Zuckerman | Feb. 25, 1930 |
| 2,072,186 | Sishc | Mar. 2, 1937 |
| 2,478,877 | Smith | Aug. 9, 1949 |
| 2,503,129 | Pautz | Apr. 4, 1950 |
| 2,538,402 | Walz et al. | Jan. 16, 1951 |
| 2,539,881 | Wilkins | Jan. 30, 1951 |
| 2,543,529 | Kroll | Feb. 27, 1951 |
| 2,583,011 | Orendorff | Jan. 22, 1952 |
| 2,599,475 | Orendorff | June 3, 1952 |
| 2,635,405 | Bozeman | Apr. 21, 1953 |
| 2,637,963 | Morkoski | May 12, 1953 |
| 2,637,964 | Orendorff | May 12, 1953 |
| 2,660,853 | Altgelt | Dec. 1, 1953 |